United States Patent [19]

Gerow et al.

[11] 4,313,372

[45] Feb. 2, 1982

[54] CITRUS PROCESSING SYSTEM AND METHOD

[75] Inventors: Gordon P. Gerow, Davenport, Fla.; John H. Blake, Portola Valley, Calif.

[73] Assignee: FMC Corporation, Chicago, Ill.

[21] Appl. No.: 111,569

[22] Filed: Jan. 14, 1980

Related U.S. Application Data

[62] Division of Ser. No. 944,044, Sep. 20, 1978.

[51] Int. Cl.³ .................... A23N 1/00; A23N 15/00
[52] U.S. Cl. ........................... 99/483; 99/495; 99/516; 159/4 VM; 159/47 R
[58] Field of Search .............. 99/483, 484, 495, 496, 99/516, 536; 426/489, 495; 159/4 VM, 47 R

[56] References Cited

U.S. PATENT DOCUMENTS

| | | | |
|---|---|---|---|
| 1,917,841 | 7/1933 | Hughes et al. | 159/4 VM |
| 2,217,547 | 10/1940 | Hall | 159/4 VM |
| 2,367,770 | 1/1945 | Hall | 159/4 VM |
| 2,525,645 | 10/1950 | Burdick et al. | 426/520 |
| 3,301,685 | 1/1967 | Harwell | 426/489 |

*Primary Examiner*—Philip R. Coe
*Assistant Examiner*—Timothy F. Simone
*Attorney, Agent, or Firm*—Louis J. Pizzanelli; Richard B. Megley

[57] ABSTRACT

A system for processing citrus fruit includes a juice extractor and finisher from which wet peel and pulp and finished juice are obtained. The stream of wet peel pulp is separated into press liquor and press cake components. The press cake is introduced into a dryer where it is contacted by superheated steam so that the press cake is elevated to a high temperature without oxidation, and moisture is driven from the press cake to provide surplus steam and dried pulp from the dryer. The press liquor is conducted to an evaporator where moisture is removed providing a molasses concentrate. The finished juice is conducted to another evaporator where moisture is removed providing a juice concentrate. The surplus steam is directed from the dryer to both of the evaporators to provide the heat for evaporation. The remainder of the steam from the dryer is directed to a heat exchanger where it is superheated without dilution with noncondensible gases for a subsequent passage through the dryer. Thus, it is unnecessary to operate a boiler to provide the steam used by the system. Provision is also made for use in the system of the heat contained in the combustion gases which are exhausted from the heat exchanger. This judicious use of heat energy provides a relatively efficient system which conserves energy.

5 Claims, 7 Drawing Figures

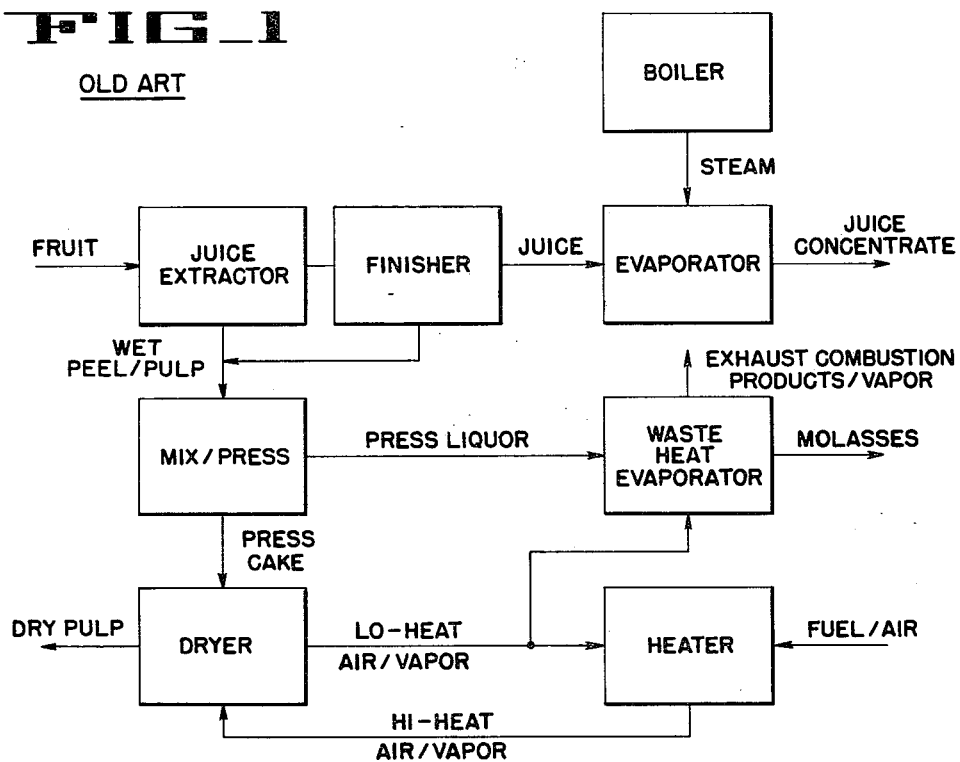
FIG_1
OLD ART
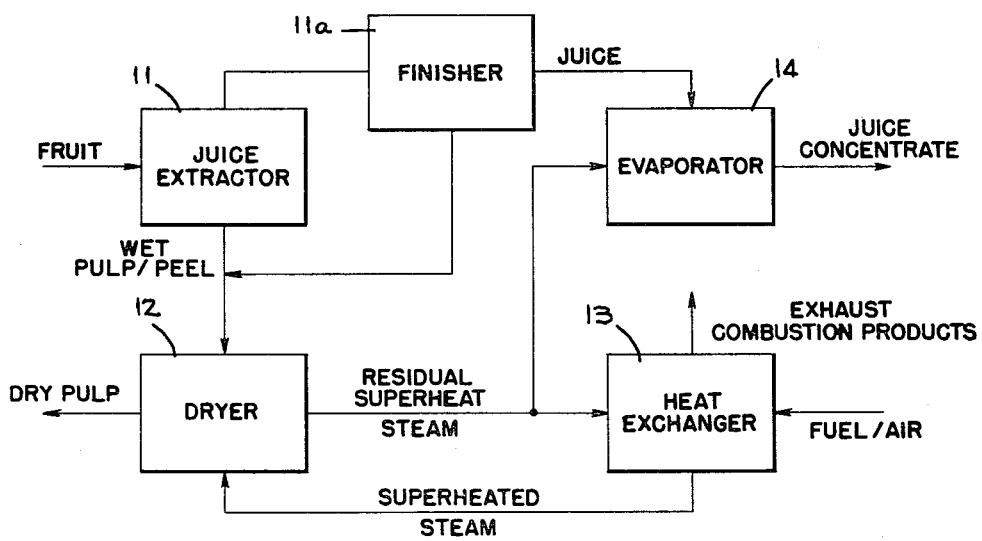
FIG_3

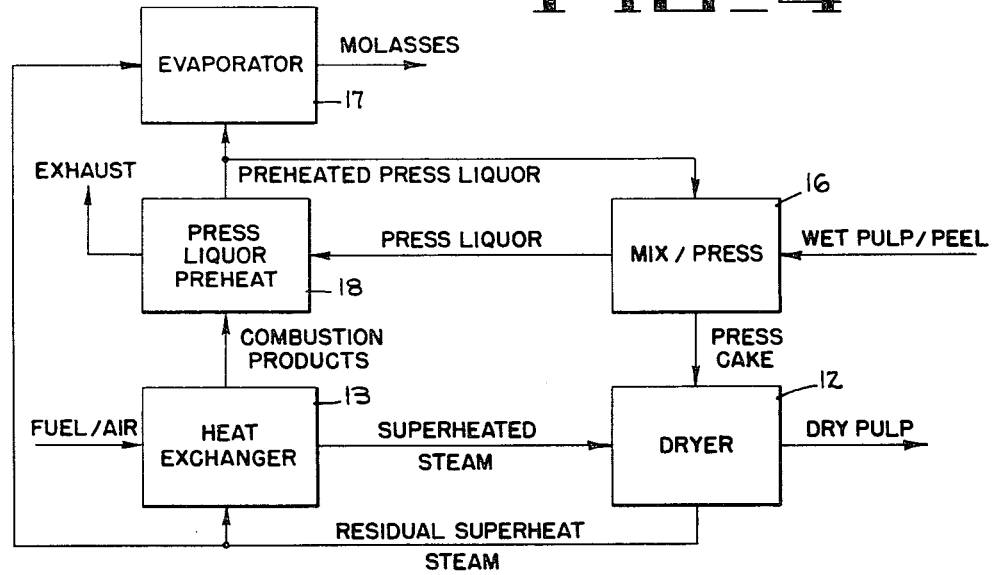
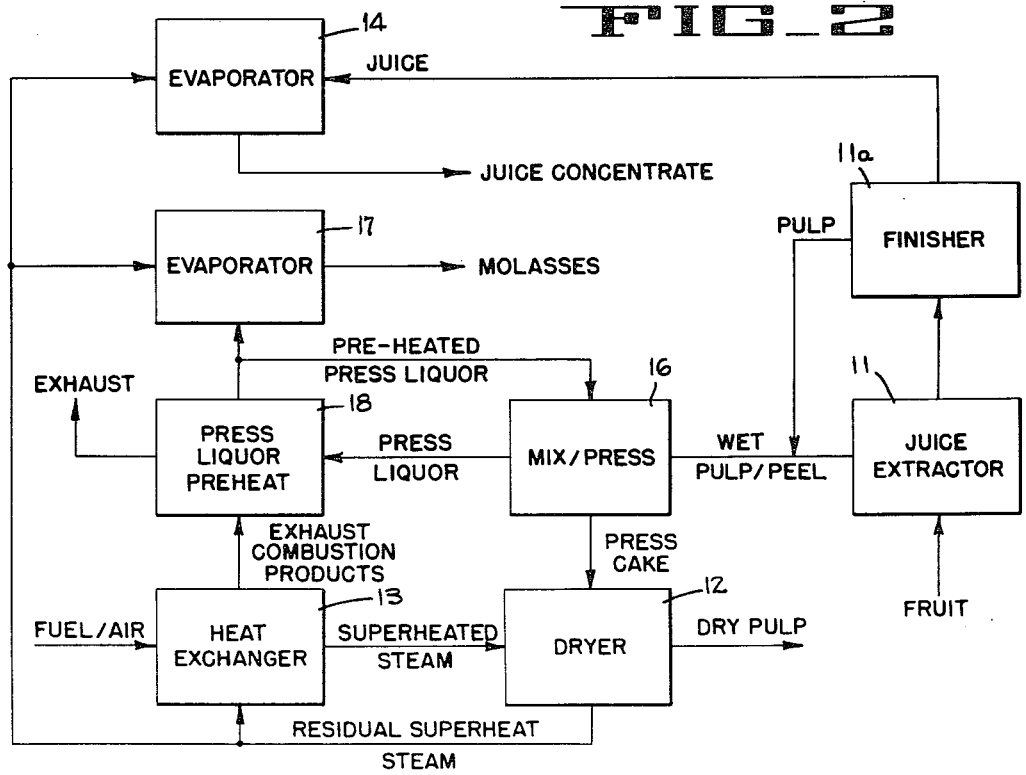

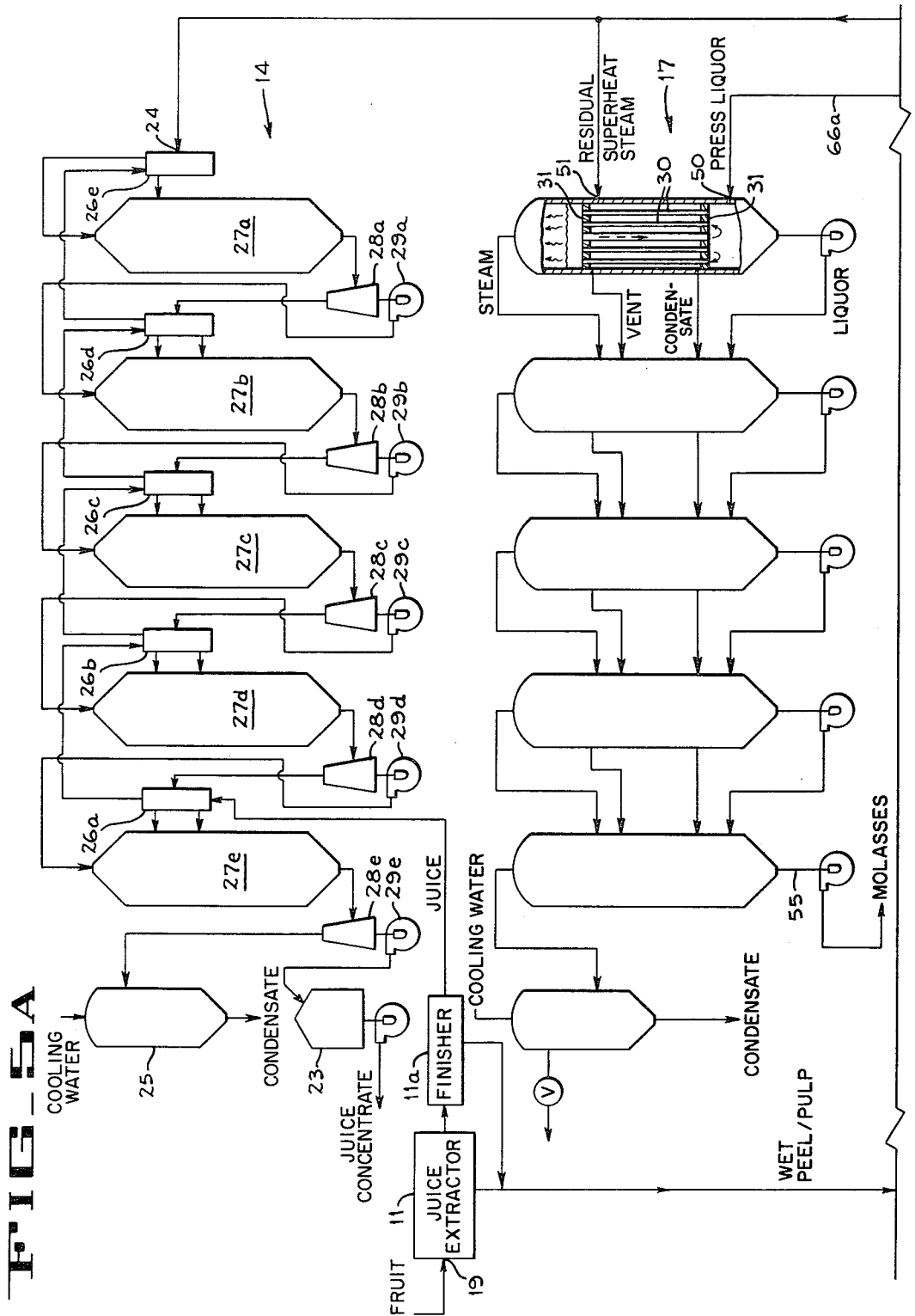

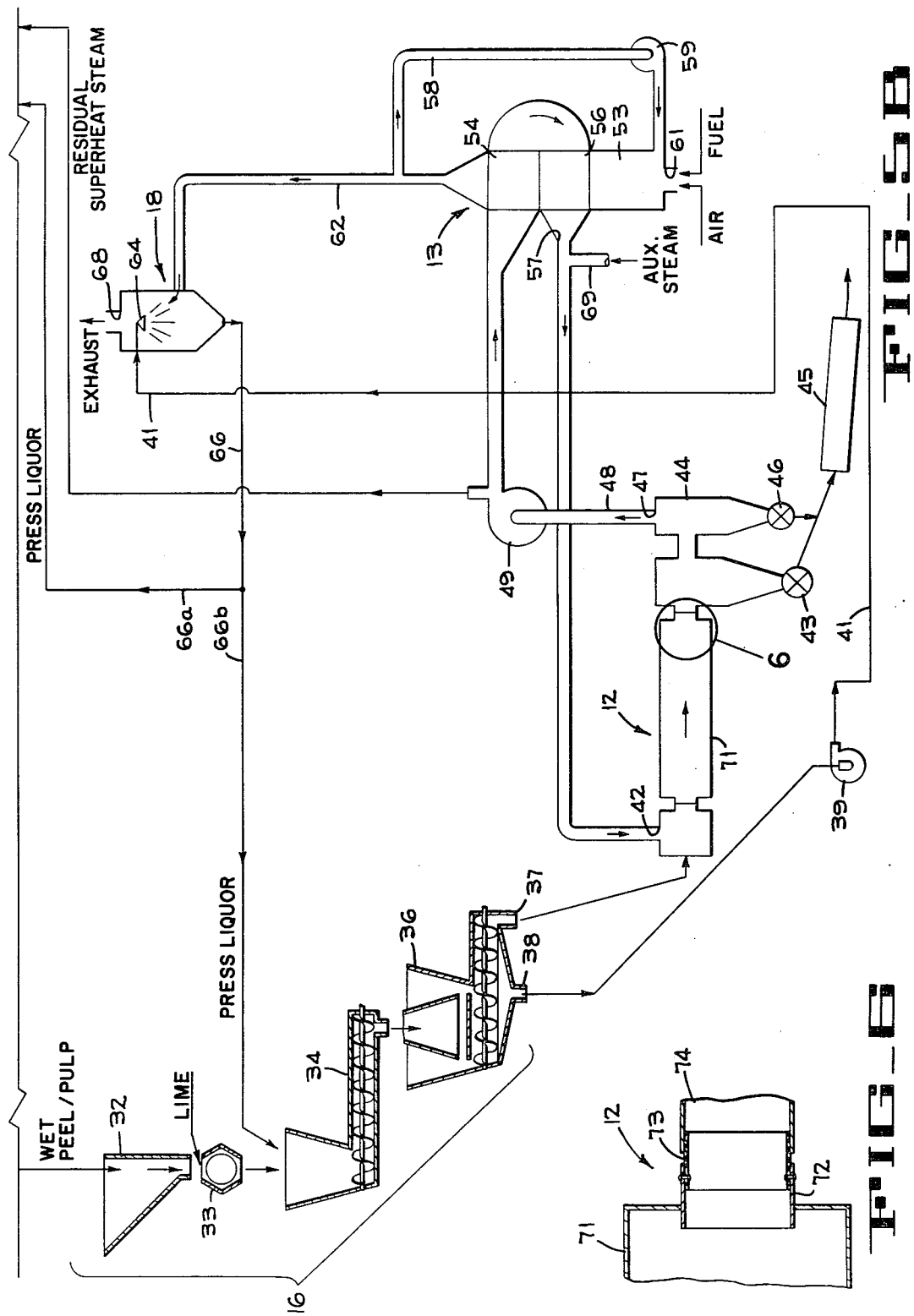

CITRUS PROCESSING SYSTEM AND METHOD

This is a division, of application Ser. No. 944,044 filed Sept. 20, 1978.

BACKGROUND OF THE INVENTION

1. Field of the Invention

This invention pertains to a method and apparatus for processing citrus products, and more particularly, it relates to a method and apparatus for processing whole citrus fruit to obtain a juice concentrate and dried peel and pulp.

2. Background of the Invention

A citrus processing system commonly in use is shown in FIG. 1 of the drawings, wherein it is indicated as old art. A juice extractor receives the citrus fruit and separates the juice from the residual wet peel and pulp. Further pulp is removed from the juice in a finisher, and the juice is conducted to an evaporator wherein it is evaporated to provide a juice concentrate. A boiler is shown providing a source of steam directed to the juice evaporator so that the required heat for evaporation is provided and juice concentration occurs. A mixer and press is disposed to receive the wet peel and pulp from which a press liquor is obtained as well as a press cake. The press cake is introduced into a dryer, and hot air from a heater is brought into contact with the press cake within the dryer to thereby drive the moisture from the press cake and provide a dry pulp output. Most of the mixture of air and water vapor obtained as the hot air contacts the press cake is directed from the dryer back to the heater where it is mixed with more heated air and noncondensible combustion gases for recirculation to the dryer. A portion of the air and water vapor from the dryer is directed to a waste heat evaporator which receives the press liquor. Evaporation in the waste heat evaporator provides a concentrate of molasses as output. A continuous flow of the air, water vapor and combustion gas mixture is thus directed to the waste heat evaporator, where it is exhausted after a portion of the heat is removed therefrom. Considerable latent heat is lost which is carried in the uncondensed water vapor in the exhaust emanating from the waste heat evaporator in the old art system of FIG. 1. Moreover, the temperature in the dryer of the old art system must be kept below a predetermined maximum so that oxidation of the pulp being dried therein will not occur in the presence of the air and vapor drying blast.

Steam has been used as the drying agent in previous drying systems in general. An example of such a system is seen in U.S. Pat. No. 1,917,841, issued to Hughes et al, wherein a liquid is shown to be dehydrated in a two-step process. Liquid to be concentrated is admitted to a concentrating evaporator to which steam is also admitted for the purpose of partially concentrating the liquid. The partially concentrated liquid is thereafter delivered to a superheated steam dehydrator where it is placed in contact with superheated steam from a superheater. Most of the steam exhausted from the dehydrator with reduced superheat, together with the steam vaporized from the liquid being concentrated, is delivered by conduits back to the superheater. A portion of the exhausted steam is diverted to the concentrating evaporator to provide the heat for this step of the process. Consequently, the liquid is dehydrated in two distinct steps, and the surplus steam obtained from the second step is used to remove some of the moisture from the liquid in the first step. Recirculation of all but the diverted portion of steam back to the dehydrator is accomplished through the superheater for the steam.

SUMMARY OF THE INVENTION

The instant invention relates to a citrus fruit processing system and includes a juice extractor which receives the citrus fruit and which has a juice output and a wet peel and pulp output. A dryer is coupled to the wet peel and pulp output and has a dried solids output and a steam output. A heat exchanger is connected to the steam output having a superheated steam output. Superheated steam is obtained when heat is transferred to steam flowing through the heat exchanger. The superheated steam output from the heat exchanger is connected to the dryer so that wet peel and pulp introduced into the dryer are heated thereby until the moisture in the wet peel and pulp is vaporized and the vapor is thereafter emitted through the steam output. A juice evaporator is connected to both the juice output from the extractor and the steam output from the dryer to provide a concentrated juice product.

The method by which the processing of citrus products is performed includes the extraction of the citrus juice from the fruit thereby providing a wet citrus peel and pulp residue. Steam which is isolated from non-condensible gases is superheated, thereby providing substantially undiluted superheated steam. The wet citrus peel and pulp residue is exposed to the superheated steam so that moisture therein is vaporized and the peel and pulp residue is dried. The vaporized moisture is mixed with the superheated steam forming a mass of steam (including a surplus portion) with a lower level of residual superheat. Water is evaporated from the citrus juice by subjecting the juice to the heat contained in the surplus portion of the steam.

BRIEF DESCRIPTION OF THE DRAWINGS

FIG. 1 is a block diagram of an old art citrus processing system, as previously described.

FIG. 2 is a block diagram of one embodiment of the citrus processing system of the present invention.

FIG. 3 is a block diagram of a subsystem of the citrus processing system of FIG. 2.

FIG. 4 is a block diagram of another subsystem of the citrus processing system of FIG. 2.

FIGS. 5A and 5B are a composite drawing in diagrammatic form of the citrus processing system of the present invention.

FIG. 6 is a sectional view of the detail indicated at 6 in FIG. 5B showing the sealed outlet portion of the dryer used in the system of the present invention.

DESCRIPTION OF THE PREFERRED EMBODIMENT

The conventional citrus processing system, shown in FIG. 1 and labeled as old art, has been previously described in the Background of the Invention portion of the present disclosure. One embodiment of the citrus processing system of the present invention is shown, in block diagram form, in FIG. 2. A juice extractor 11 such as that disclosed in U.S. Pat. No. 2,649,730 issued to J. M. Hait is disposed to receive whole citrus fruit and extract the juice therefrom. The Hait patent discloses an apparatus in which a number of pairs of upper and lower cups having interdigitating teeth are mounted in a common framework. Each upper cup is movable relative to its associated lower cup such that when a citrus fruit is placed in the lower cup and the upper cup is moved downwardly toward the lower cup, a button is cut through the lower portion of the rind of the fruit. As the upper cup continues toward the lower cup the fruit is compressed as the fingers interdigitate, and the juice from the fruit is forced out through the hole in the rind to be drawn away by a tube placed thereunder. Peel and pulp are discharged from the extractor separately from the juice. The juice is directed into a finisher which removes further pulp therefrom.

An improvement over the juice extracting machine described in the aforementioned Hait patent is disclosed in U.S. Pat. No. 2,780,988 issued to Wilber C. Belk et al. The Belk et al disclosure includes the supporting frame and drive mechanism of the Hait machine and structure which functions to extract and collect the juice from a citrus fruit, to extract and collect the peel oil from the citrus rind, to break up and eject the peel and to dejuice and discharge the pulp and internal membranes of the fruit. Complete details of the structure and the manner in which the various parts cooperate to perform the foregoing operations may be found in the Belk et al patent.

Of the above-named components of the citrus fruit obtained from the juice extractor 11 the juice, the wet peel and the wet pulp are of interest in the apparatus and process disclosed in this invention. Referring again to FIG. 2, fruit is delivered to the juice extractor 11 which provides a juice output and a wet pulp and peel output. The juice output is conducted to a conventional finisher 11a which may be of the type shown in U.S. Pat. No. 2,910,183 to D. W. Hayes and which separates further pulp from the juice. The finished juice is directed to a juice evaporator 14. The wet pulp and peel are conducted to a mixing and pressing apparatus 16. The mixing and pressing apparatus 16 provides a moist press cake output and a press liquor output. The press cake output is directed to a dryer 12 which provides a dry pulp output. The wet press cake in the dryer 12 is exposed to superheated steam obtained from a heat exchanger 13. The superheated steam mass is joined by steam resulting from the drying of the wet press cake, whereby surplus steam is provided. The entire steam mass at lower superheat is exhausted from a steam output on the dryer 12. A portion of the exhausted steam mass is redirected to the heat exchanger 13 where the heat of combustion obtained by the burning of a fuel-air mixture therein is transferred to the steam without directly contacting and therefore diluting the steam with noncondensible gases. This superheated steam is thereafter directed to the dryer 12 for drying the wet pulp and peel. The surplus exhausted steam from dryer 12 is directed to a steam input on the juice evaporator 14. Consequently, the juice directed thereto is dehydrated to provide a juice concentrate output therefrom. It should be noted that the heat requirements of the juice evaporator 14 are completely filled by steam provided from within the system itself, and no external source of steam, such as a boiler, is required. This judicious use of the heat generated by the system conserves energy and provides a system which is highly efficient.

The press liquor from the mixing and pressing apparatus 16 is directed to a press liquor preheater 18 and is exposed therein to the exhausted hot combustion gases from the burning fuel within heat exchanger 13. Consequently, heat energy is recovered from the exhausted combustion gases and stored in the preheated press liquor, some water is evaporated from the press liquor, and potential pollutants and sulphur compounds which may be present in the combustion gases and which may pose air pollution and odor nuisances are absorbed by the press liquor. Some of the preheated press liquor is redirected back to the mixing and pressing apparatus 16. Addition of preheated press liquor at the apparatus 16 assures that adequate water is available in the moist press cake to provide a sufficiently wet slurry of press liquor and press cake so that lime which is added as hereinafter described may properly react with the peel to break down the cellular structure of the peel and release moisture contained therein. The preheated press liquor addition also elevates the temperature of the press cake so that the moisture therein is more readily vaporized by the superheated steam in the dryer. The remainder of the preheated press liquor is directed to a press liquor evaporator 17, which in this invention may be the rising film type well known to those in this field and which receives its heat from the excess exhaust steam from the dryer.

In the subsystem of FIG. 3 the wet peel and pulp is shown being directed to the dryer 12 which has a dry pulp output. The wet pulp and peel is subjected to the heat in superheated steam which vaporizes the water in the wet pulp and peel. The vaporized water joins the body of superheated steam which, as mentioned hereinbefore, now contains a lesser degree of superheat after performing the drying function. The entire body of steam with lower superheat is expelled from the dryer through the steam outlet in the dryer 12 to the heat exchanger 13. The body of steam being greater at the steam outlet from dryer 12 than the body of steam introduced as superheated steam thereto, a portion of the surplus steam is directed to the evaporator 14. The main body of steam from the steam outlet on dryer 12 is introduced into the heat exchanger 13 where it is isolated from noncondensible gases and superheated by heat transfer thereto from the combustion products of the fuel-air mixture. The combustion products are exhausted from the heat exchanger 13, and the substantially undiluted superheated steam is recirculated to the dryer 12 to once again heat the wet pulp and peel passing therethrough and to thereby vaporize the moisture therein.

Since the superheated steam introduced into the dryer 12 as shown in FIG. 3 is substantially undiluted with non-condensible gas, the steam with residual superheat emitted from dryer 12 at the steam outlet and introduced into evaporator 14 is also undiluted. Dryer 12 is appropriately sealed from the surrounding atmosphere so that substantially no air enters therein. The dryer 12 may be operated at an internal pressure slightly higher than atmospheric pressure to assure no air dilution of the body of steam emitted therefrom. An efficient five effect evaporator may therefore be used for the evaporator 14, since substantially all of the heat carrying vapor directed thereto is condensible steam. Since there is substantially no escape of water vapor from the evaporator 14, there is considerable heat energy conservation as nearly all of the heat energy is utilized in evaporating the citrus juice which is then provided at a juice concentrate output on evaporator 14.

Another subsystem of the FIG. 2 embodiment of the present invention is shown in FIG. 4 where the wet pulp and peel obtained from citrus fruit processing is directed to the mixing and pressing device 16. A press cake and a press liquor is produced by the mixing and pressing device 16 as previously explained. The wet pulp and peel delivered to the apparatus 16 is first mixed with lime to break down the cellular construction of the pulp and peel and is then compressed to drive excess press liquor therefrom. The moist press cake is directed to the dryer 12 which has a dry pulp output. The moist press cake is dried as described hereinbefore by exposure to superheated steam conducted to the dryer 12 from the heat exchanger 13. The superheated steam relinquishes heat in the process of drying the press cake and is exhausted from the dryer as steam with residual superheat. The heat exchanger 13 transfers heat from hot combustion gases to the steam exhausted from the dryer 12 and conducted to the heat exchanger 13. The heat exchange is accomplished without contact with noncondensible gases and therefore without dilution of the steam by noncondensible gases. The drying process within the dryer 12 produces surplus steam as the moisture which is evaporated from the press cake being processed therein joins the drying steam. A portion of the exhausted steam in the subsystem of FIG. 4 is diverted to the press liquor evaporator 17. The press liquor from the mixing and pressing apparatus 16 is conducted to the press liquor preheater 18, as shown in FIG. 4, where it is exposed to the exhausted combustion gases resulting from the combustion of fuel in the heat exchanger 13. The combustion provides the heat for superheating the steam which passes through the heat exchanger 13. The press liquor with some of the moisture removed therefrom, due to the exposure to the exhausted combustion gases, is thereafter directed to the evaporator 17 where it is further dehydrated to thereby provide a molasses output. In this fashion, additional heat is recovered from the hot combustion gases. When oil having some sulphur content is used for combustion fuel, the press liquor, which is alkaline, absorbs some of the sulphur compounds contained in the hot combustion gases. The products of combustion are therefore exhausted from the press liquor preheater with some of the pollutants and unpleasant odor characteristics removed therefrom. A portion of the warmed press liquor is redirected to the mixing and pressing apparatus 16 to elevate the press liquor and press cake temperatures and to enhance the lime reaction as previously explained.

The diagrams of FIGS. 5A and 5B show the system depicted in block form in FIG. 2 and include the juice extractor 11 and juice finisher 11a disposed to receive fruit at a fruit inlet 19 and to separately provide juice and wet peel and pulp. As described hereinbefore, the juice extractor may be of the type disclosed in U.S. Pat. No. 2,780,988 to Belk et al and the finisher may be of the type disclosed in U.S. Pat. No. 2,910,183 to Hayes. The finished juice is directed to a juice inlet 23 on the juice evaporator 14. The evaporator 14 is of the type known in this field as an accelerated falling film evaporator. This evaporator is shown in FIG. 5A as a five effect, single pass (no recirculation) device with a flash cooler 23 and a barometric type condenser 25. Juice enters the evaporator through a number of preheaters 26a through 26e. During the course of the passage through the preheaters the juice is pasteurized. Part of the residual superheated steam is directed to a steam input 24 on the preheater 26e which is the final preheater for the juice. The preheated juice is directed from preheater 26e to the top of a first effect 27a where it passes through a nozzle and travels down through a distribution cone and spreads evenly over a number of parallel tubes contained in the first effect body. Steam is directed from the final preheater 26e to contact the tubes in the first effect and the juice travelling through the tubes absorbs heat from the steam. The juice boils and the released vapors from the juice accelerate the downward flow of the juice in the tubes thereby increasing heat transfer rate. The partly dehydrated juice and the water vapors, exit the tube nest at the bottom and are directed to a cyclone type separator 28a. Juice travels downwardly from the separator to a first pump 29a where it is pumped to the top of a second effect 27b. Each effect 27a through 27e is similar in that juice enters through the top and is accelerated downwardly therethrough by the evaporation which occurs therein. The separated vapors from the first separator 28a are directed to the preheater 26d to assist in preheating the feed juice and are then conducted to the second effect 27b to become the heating medium therefor. Vapors and juice are extracted from the second effect, separated and transmitted to the third effect 27c in the same fashion as described for the second effect. Likewise vapors and juice of successively higher concentration are directed to the fourth and fifth effects 27d and 27e. Juice and vapors from the fifth effect are separated at 28e and the vapors are condensed in the barometric condenser 25. The juice from separator 28e is pumped by pump 29e to the flash cooler 23 from which it is discharged as cooled juice concentrate. The evaporator 14 is available as standard commercial equipment and is typified by accelerated falling film evaporators available from Gulf Machinery Company of Dunedin, Fla.

The wet peel and pulp is directed to the mixing and pressing apparatus 16 which will be seen from FIG. 5B to include a bin 32 from which the wet peel and pulp is released at a predetermined rate to a shredder 33. A predetermined amount of lime is also introduced with the wet peel and pulp in the shredder 33. Shredder 33 is of a standard variety and is exemplified by such devices available from Gulf Machinery Company, Dunedin, Florida. The shredded peel and pulp, together with the lime additive, is introduced into a mixer-reactor 34 where the cellular structure of the peel and pulp is broken down by the interaction with the lime. After mixing and cellular breakdown has occurred, the mixture is introduced to a press 36 which mechanically squeezes the mixture. The press 36 has a press cake output 37 coupled to the dryer 12. Press 36 also has a press liquor output 38 which is connected through a pump 39 to a press liquor output line 41.

The press cake outlet 37 is connected (by conventional conveyor means) to the dryer 12 so that wet citrus peel and pulp in pressed condition is introduced thereto. Dryer 12 is often termed a rotary kiln in this field and, in this embodiment, may be a modified Vincent vacuo-dehydrator manufactured by Dan B. Vincent, Inc., Tampa, Fla., having a 30,000 pound per hour water evaporation rate capability. The modification to dryer 12, which will be hereinafter described, includes structure for providing 0.2 to 1.0 inches of water positive pressure within the dryer 12 to preclude entry of air therein and therefore preclude oxidation of the product being dried. It is also essential to prevent dilution of the steam within the dryer 12 with noncondensible gases for reasons to be given hereinafter.

Superheated steam is introduced into the dryer 12 through a superheated steam inlet 42. The superheated steam is mixed with the moist pressed peel and pulp, thereby driving off moisture as surplus steam therefrom.

The surplus steam is mixed with the superheated steam to form a steam mass which is reduced to a lower degree of superheat by extraction of the heat of vaporization therefrom. The dried pulp is withdrawn from a pulp airlock 43. The mass of steam at the lower degree of superheat is passed into a cyclone 44 in which the solids are separated from the gaseous phase steam. The solids are extracted from the cyclone 44 through an additional airlock 46. The solids from airlock 46 are joined with the dried product extracted through the pulp airlock 43. Cyclone 44 is generally included as a part of the dryer 12, and the airlocks 43 and 46 are standard varieties of commercially available star valves. The dried solids are thereafter introduced into a cooler 45 prior to dispensing them to storage or packaging.

Cyclone 44 has a steam outlet 47 for the steam mass at the lower degree of superheat. Steam outlet 47 is connected through a conduit 48 to a recirculation fan 49. The recirculation fan 49 requires 200 hp for operation at 60% efficiency. There is a pressure differential between the upstream and downstream sides of recirculation fan 49 of approximately 6 inches of water. As a consequence, downstream of the recirculation fan 49 there is two to three inches of water positive pressure and upstream thereof, as well as in cyclone 44, there is two to three inches of water negative pressure. This is the only spot within the system being disclosed herein where there is a deliberately imposed negative pressure. The negative pressure in cyclone 44 upstream of recirculation fan 49 provides enough pressure drop through the cyclone for it to remove substantially all of the solid particles from the stream of vapor and so keep the solids from dryer 12 from getting into the heat exchanger 13 and from causing charring therein and clogging of the steam passages therethrough.

The positive pressure, downstream of recirculation fan 49 is connected to the input of heat exchanger 13. The downstream side of recirculation fan 49 is also connected to steam input 24 on juice evaporator 14 and a steam input 51 on the press liquor evaporator 17. Evaporator 17 is exemplified by the five effect rising film evaporators manufactured by Gulf Machinery Company of Dunedin, Fla. The evaporator 17 serves to concentrate the press liquor delivered to the liquid chamber of the first effect of evaporator 17 through a press liquor input 50. The press liquor is dehydrated to a molasses concentrate provided at a molasses output 55 from the last effect in evaporator 17, as seen in FIG. 5A. The steam inlet 51 conducts steam to the steam chest in the first effect. A number of tubes 30 run between a pair of tube plates 31 which define the ends of the steam chest. Press liquor is introduced through the inlet 50 until the liquid level rises in the tubes above the top tube plate. The press liquor circulates generally in an upward direction through the outer tubes and generally downwardly through a larger center tube termed a "downcomer". Heat transfer to the circulating press liquor drives off water vapor which is collected at the top of the first effect in evaporator 17 and is delivered to the steam chest in the second effect. The top of the steam chest in the first effect is also vented through a restricted conduit to the steam chest in the second effect to prevent the buildup of non-condensible gas in the first effect. Condensate is delivered from the bottom of the steam chest in the first effect to the bottom of the steam chest in the second effect. Molasses concentrate is moved by a pump from the bottom of the first effect to the liquid chamber in the second effect. As water vapor is evaporated from each charge of liquid in each succeeding evaporator effect, the remaining concentrate is pumped by means of another pump to the succeeding effect as shown in FIG. 5A. The vapor from the last effect in evaporator 17 is directed to a condenser similar to the condenser 25 in the juice evaporator 14 where it is condensed and joined with the condensate from the steam chest in the last effect and discharged therewith. The concentrated molasses is discharged through the concentrate output 55 on the last effect in evaporator 17. Control of cooling water temperature to the condenser and the input steam temperature to steam inlet 51 on the first effect causes all of the intermediate effects to automatically adjust in temperature therebetween in a manner well known to those of skill in this field.

A combustion chamber 53 is provided in heat exchanger 13 (FIG. 5B) as shown. The combustion chamber is isolated from first and second steam passes 54 and 56 respectively through the heat exchanger. The mass of steam remaining after surplus steam is diverted to the steam inputs 24 and 51 on evaporators 14 and 17, respectively, is directed through the first and second steam passes. Heat is exchanged between the steam which is passed through the heat exchanger and the hot combustion gases resulting from the combustion in combustion chamber 53. Isolation between the combustion gas and the steam is maintained within the heat exchanger 13. As superheated steam emerges from a superheated steam outlet 57 on heat exchanger 13, it is undiluted by the combustion gases and is therefore substantially free of noncondensible gases. It is desirable to keep the maximum temperatures within combustion chamber 53 to approximately 2,000° F. for the protection of the metal structure exposed thereto. Since the freshly burned combustion products are at approximately 3,000° F. some cooling thereof is required. Certain of the combustion products are recirculated about the combustion chamber through a recirculation conduit 58 containing a recirculation fan 59. The recirculation conduit 58 results in a mixing in the combustion chamber of a substantially equal quantity by weight of combustion products at 500° F. (from conduit 5B) with the freshly burned combustion products at approximately 3,000° F. to provide a temperature of about 2,000° F. in the hot combustion gases flowing through the heat exchanger 13.

Combustion chamber 53 has a fuel and air inlet 61. Heat exchanger 13, in this embodiment, has approximately 11,000 sq. ft. of heat exchange area. The required heat exchange area is obtained by using 3-inch diameter steel tubes 3.8 ft. long in each of the first and second passes 54 annd 56. 1,890 tubes are utilized in each pass through the heat exchanger 13. A heat transfer coefficient of 7 BTU/hr per square foot per degree F. is assumed for this embodiment. Water vapor passes through the 3-inch diameter tubes within the first and second passes 54 and 56 in heat exchanger 13 at a flow rate of 3,710 cu. ft. per second. Combustion products flow by the 11,000 sq. ft. of heat exchange area at a rate of 455 cu. ft. per second.

Thus, the mass of steam emerging from cyclone 44 on the dryer 12 at approximately 300° F. is utilized in part to provide heat for evaporators 14 and 17, and the remainder is directed through the first and second passes 54 and 56 of heat exchanger 13. Superheated steam is therefore provided at approximately 600° F. which is connected to the superheated steam input 42 on dryer 12.

Exhaust gases from combustion chamber 53 are conducted through an exhaust gas conduit 62 to the press liquor preheater 18 which, as shown in FIG. 5B, comprises a tank. Press liquor from the press liquor outlet line 41 is introduced into press liquor preheater 18 through a spray head 64. The hot exhaust gases at approximately 500° F. are brought into contact with the press liquor emanating from spray head 64 to thereby transfer heat to the spray of press liquor and to evaporate some of the water therefrom. The press liquor in a partially concentrated and preheated condition is collected in a sump at the bottom of press liquor preheater 18 and conducted therefrom through a press liquor output line 66. Press liquor outlet line 66 is bifurcated, conducting some of the heated press liquor to the first effect in press liquor evaporator 17 through line 66a and the remainder to mixer-reactor 34 through line 66b. Thus, the peel and pulp is preheated prior to delivery of the moist press cake to the dryer 12.

The hot combustion gases from the heat exchanger 13 will contain certain sulphur compounds when heavy fuel oil is used as the fuel in combustion chamber 53. The press liquor which is introduced into the press liquor preheater 18 through the press liquor outlet line 41 is alkaline in character. As a consequence, a substantial amount of the sulphur compounds contained in the combustion produces exhaust gases is absorbed by the alkaline press liquor and carried away with the press liquor. Certain pollutants and odor nuisance components within the exhaust gases are therefore removed prior to emission of the exhaust gases to the atmosphere through an exhaust 68 from press liquor preheater 18.

The manner in which the system of FIGS. 5A and 5B operates will now be described. With 164, 360 lbs. per hour of citrus fruit introduced into the juice extractor 11, 87,600 lbs. per hr. of finished juice and 76,700 lbs. per hour of wet peel and pulp are produced. The finished juice is provided to juice inlet 23 on evaporator 14. With 17,870 lbs. per hour of surplus steam from dryer 12 introduced into steam inlet 24, a juice concentration of 16,180 lbs. per hour with 65% by weight of sugar is obtained from juice condensate output 31.

The wet peel and pulp is deposited in bin 32 and, together with lime at the rate of 460 lbs. per hour, is introduced to the shredder 33. Warmed and partially dehydrated press liquor is introduced into the mixer-reactor 34 at a rate of 16,650 lbs. per hour at a temperature of approximately 120° F. The cellular structure of the pulp and peel is broken down by the lime in the mixer-reactor 34, and the prepared mix is pressed in the press 36. 49,950 lbs. per hour of press liquor is provided through press liquor outlet 38 and is urged through the press liquor outlet line 41 by pump 39. 43,860 lbs. per hour of press cake, which still has over 70% water content, is provided at press cake outlet 37. Dryer 12 accepts the press cake at about 80° F., which is thereafter exposed to the superheated steam at approximately 600° F. The superheated steam from superheater 13 flows at a rate of approximately 243,500 lbs. per hour.

Dryer 12 is provided with seals as discussed hereinbefore and as seen in FIG. 6 of the drawings. The seals are provided at each end of a rotating kiln section 71 on the dryer 12 between the rotating and stationary portions of the dryer. The seals utilized in the embodiment of FIGS. 5A and 5B are capable of sustaining a slight positive pressure within the dryer of from 0.2 to 1.0 inches of water. This has been found to be sufficient to preclude entry of noncondensible gases, such as air, into the dryer 12 which would dilute the steam mass therein. As seen in FIG. 6, each of the seals includes a pipe 72 which is attached to the end of the rotating kiln section 71 and aligned coaxially with the kiln section axis of rotation. A composition sleeve 73 is fixed within the attached pipe 72. The composition sleeve 73 is sized to provide a sliding contact fit within a stationary connecting pipe 74, one of such connecting pipes being attached to the stationary structure of dryer 12 at both the wet peel and pulp inlet end and the dried peel and pulp outlet end. The composition sleeve 73 thus rotates within and is in contact with the inner diameter of the connecting pipe 74 providing a seal with the capability of sustaining the aforementioned pressure levels thereacross.

The dried peel and pulp is extracted from the dryer 12 through airlock 43 which prevents any appreciable amount of air from entering dryer 12 during extraction and thereby maintains the substantially undiluted characteristic of the steam therein. Further separation of gas from solids is obtained within cyclone 44. This separation dictates the use of the slightly negative pressure within cyclone 44. Additional dry pulp is extracted from cyclone 44 through airlock 46. Total amounts of dried pulp and peel obtained from the embodiment of FIGS. 5A and 5B in a somewhat granular form amount to about 13,860 lbs. per hour, such material having an 8.2% water content.

The mass of steam with residual superheat is withdrawn from cyclone 44 through steam outlet 47 by recirculation fan 49 at approximately 300° F. The surplus steam obtained from dryer 12 through the vaporization of water contained in the press cake is directed to steam inlet 24 on evaporator 14 at a rate of 17,870 lbs. per hour and to steam inlet 51 on evaporator 17 at a rate of 12,130 lbs. per hour as hereinbefore described. Of the total 273,500 lbs. per hour of steam withdrawn from dryer 12, 243,500 lbs. per hour are directed through the first and second passes 54 and 56 in heat exchanger 13 to emerge through steam outlet 57 and enter dryer 12 as superheated steam through input 42.

Combustion air is introduced into the fuel and air inlet 61 at a rate of 8.170 cu. ft. per minute to provide 25% excess air when heavy fuel oil is introduced to combustion chamber 53 at a rate of 269 gallons per hour. The excess air is introduced so that all of the fuel is burned which thereby reduces the odors in the exhaust gases. Of the 2800 moles per hour of combustion products at 500° F. which are exhausted from the heat exchanger, 1520 moles per hour are recycled through the combustion products recirculation conduit 58 and back into the combustion chamber 53. Recirculation fan 59 produces 3-inches of water pressure differential between the inlet and outlet sides of the combustion chamber and operates at 60% efficiency using 26 hp. Products of combustion at 500° F. at a rate of 1295 moles per hour are delivered through exhaust gas conduit 62 to the press liquor preheater 18. The press liquor preheater operates to recover heat from the combustion product gases, to evaporate some of the water from the press liquor emanating from spray head 64, and to remove pollutants and sulphur compounds from the exhaust gas through absorption by the alkaline press liquor. Exhaust gases are emitted from exhaust port 68 in quantities of 1,405 moles per hour together with 162 moles per hour of water vapor at 120° F. The partially dehydrated and preheated press liquor in press liquor outlet 66 is delivered at the rate of 31,300 lbs. per hour and 120° F. to press liquor input 51 at the first effect of evaporator 17. Press liquor is recycled to mixer-reactor 34 at a rate of 16,650 lbs. per hour at 120° F. Molasses is withdrawn from molasses output 55 on evaporator 17 at a rate of about 4,000 lbs. per hour.

At startup of the system of FIGS. 5A and 5B, steam should be introduced through the steam input 42 to the dryer 12 until all air is purged from the steam path. A separate source of startup steam may be injected into the system through an auxiliary steam input 69 (FIG. 5B), or the first few charges of steam which pass through the system may be discarded as diluted with non-condensible gases. It is of importance to avoid dilution of the steam mass with non-condensible gases since air or other non-condensible gases tend to concentrate around the cooling coils in a condenser or to insulate the heating tubes in an evaporator thereby preventing heat transfer from the heated steam to the liquid which is to be dehydrated. It is further important to the efficiency of the system to avoid allowing gases mixed with substantial amounts of water vapor to escape from the evaporators 14 and 17 since the latent heat contained in the water vapor will be lost from the system. The advantages in efficiency of the five effect evaporator 17 of FIG. 5 over the prior art waste heat evaporator shown in FIG. 1 thus become apparent.

The superheated steam dryer 12 and the heat exchanger 13 avoid mixing non-condensible combustion products with the water vapor evaporated from the citrus peel. Because this water vapor is not diluted with non-condensible gas it need not be discharged to the atmosphere as vapor but can instead be used entirely as a heat source to concentrate juice and molasses in the five effect evaporators 14 and 17. Thus, the disclosed system generates and recirculates steam and makes it unnecessary to operate the boiler seen in the prior art system of FIG. 1 for generating steam to concentrate citrus juice and molasses. Also, because the dryer discharges undiluted steam, the three effect waste heat evaporator seen in FIG. 1, which is normally used to concentrate press liquor into molasses, is replaced with the more efficient five effect evaporator 17 to thereby save additional energy. Further, heat energy from the exhaust from the superheater is transferred to and stored in press liquor for subsequent use in the process. Based on conservative calculations the disclosed system saves more than 15,000 lbs. per hour of steam in a plant processing 165,000 lbs. per hour of citrus fruit.

Although the best mode contemplated for carrying out the present invention has been herein shown and described, it will be apparent that modification and variation may be made without departing from what is regarded to be the subject of the invention.

What is claimed is:

1. A citrus fruit processing system comprising a juice extractor adapted to receive the citrus fruit and having a juice output and a wet peel and pulp output,
   a means for removing liquor from the wet pulp and peel output coupled to said juice extractor and adapted to receive the wet pulp and peel therefrom, said means for removing liquor having a liquor output and a press cake output,
   a dryer coupled to said press cake output and having a dried solids output and a steam output,
   a heat exchanger coupled to said steam output and having a superheated steam output, said heat exchanger having an isolated combustion chamber which operates to transfer heat to steam passing therethrough without contact between said steam and combustion products produced in said chamber,
   said superheated steam output being coupled to said dryer whereby wet peel and pulp introduced into said dryer is heated by superheated steam until a major portion of the moisture therein is vaporized and emitted through said steam output,
   a juice evaporator coupled to said juice output and to said steam output of said dryer, and having a concentrated juice output, said juice evaporator operating to dehydrate the juice,
   means for preheating liquor coupled to said means for removing liquor, said means for preheating being connected to receive the exhaust combustion products from said heat exchanger combustion chamber whereby the liquor is preheated by the combustion products, and,
   a second evaporator coupled to said means for preheating liquor and to said steam output of the dryer, said second evaporator operating to dehydrate the liquor.

2. A citrus fruit processing system as in claim 1 together with means coupled to said press liquor preheater for recycling a portion of the preheated press liquor to said press, whereby peel and pulp introduced into said dryer is preheated.

3. A citrus fruit processing system as in claim 1 wherein steam passing through said steam output of the dryer is at a temperature of approximately 300° F. and superheated steam passing into said dryer from said superheated steam output of the heat exchanger is at a temperature of approximately 600° F.

4. A citrus fruit processing system as in claim 1 wherein said evaporator includes means for condensing all of the steam therein.

5. A citrus fruit processing system as in claim 1 wherein both said juice evaporator and said second evaporator include means for condensing all of the steam therein.

* * * * *